United States Patent
Poth, Jr.

(10) Patent No.: US 9,909,510 B2
(45) Date of Patent: Mar. 6, 2018

(54) METHOD OF DEFINING GAS TURBINE ENGINE CONTROL RATINGS

(71) Applicant: United Technologies Corporation, Hartford, CT (US)

(72) Inventor: Stefan M. Poth, Jr., South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 408 days.

(21) Appl. No.: 14/430,589

(22) PCT Filed: Mar. 15, 2013

(86) PCT No.: PCT/US2013/032047
§ 371 (c)(1),
(2) Date: Mar. 24, 2015

(87) PCT Pub. No.: WO2014/055124
PCT Pub. Date: Apr. 10, 2014

(65) Prior Publication Data
US 2015/0275767 A1  Oct. 1, 2015

Related U.S. Application Data

(60) Provisional application No. 61/708,353, filed on Oct. 1, 2012.

(51) Int. Cl.
*F02C 9/48* (2006.01)
*G05B 19/02* (2006.01)
(Continued)

(52) U.S. Cl.
CPC ............. *F02C 9/48* (2013.01); *F02C 9/00* (2013.01); *F02C 9/16* (2013.01); *F02C 9/26* (2013.01);
(Continued)

(58) Field of Classification Search
CPC ...... F02C 9/48; F02C 9/26; F02C 9/16; F02C 9/00; G05B 15/02; G05B 17/02; G05B 19/02
See application file for complete search history.

(56) References Cited

U.S. PATENT DOCUMENTS 4,275,557 A  6/1981  Marvin et al.
4,313,167 A  1/1982  Brawn
(Continued)

FOREIGN PATENT DOCUMENTS

EP  1811133 A2  7/2007
EP  2289799 A2  3/2011
WO  00/71876 A1  11/2000

OTHER PUBLICATIONS

European Search Report for EP Application No. 13843574.8 dated Sep. 4, 2015.
(Continued)

*Primary Examiner* — Dale W Hilgendorf
(74) *Attorney, Agent, or Firm* — Carlson, Gaskey & Olds, P.C.

(57) ABSTRACT

A disclosed control system and method of controlling a gas turbine engine utilizes a thrust rating schedule generated from airframe selected requirements. The system utilizes a generic logic structure for ratings combined with simple selection logic to customize rating schedules for multiple airframe customers. The use of a common generic logic structure to generate rating schedules for different airframe manufacturers reduces software design effort, memory consumption, and processor throughput requirements.

15 Claims, 6 Drawing Sheets

(51) Int. Cl.
*G05B 17/02* (2006.01)
*F02C 9/16* (2006.01)
*G05B 15/02* (2006.01)
*F02C 9/00* (2006.01)
*F02C 9/26* (2006.01)
*G06Q 10/06* (2012.01)
*G06Q 10/00* (2012.01)

(52) U.S. Cl.
CPC ............ *G05B 15/02* (2013.01); *G05B 17/02* (2013.01); *G05B 19/02* (2013.01); *G06Q 10/00* (2013.01); *G06Q 10/06* (2013.01)

(56) References Cited

U.S. PATENT DOCUMENTS

| | | | |
|---|---|---|---|
| 5,033,010 A | 7/1991 | Lawrence et al. | |
| 5,048,285 A | 9/1991 | Schmitt et al. | |
| 5,285,634 A | 2/1994 | Hoff et al. | |
| 5,893,040 A * | 4/1999 | Gunn | G05D 1/101 |
| | | | 244/76 R |
| 6,311,106 B1 | 10/2001 | Dupont | |
| 6,748,744 B2 | 6/2004 | Peplow et al. | |
| 6,778,884 B2 * | 8/2004 | Chapman | F02C 9/28 |
| | | | 701/3 |
| 6,880,784 B1 * | 4/2005 | Wilkinson | B64D 31/06 |
| | | | 244/195 |
| 7,010,904 B2 | 3/2006 | McBride | |
| 7,471,996 B2 * | 12/2008 | Bartel | F02C 9/28 |
| | | | 701/3 |
| 2002/0116116 A1 * | 8/2002 | Mathew | G05B 15/02 |
| | | | 701/115 |
| 2010/0287905 A1 | 11/2010 | Shepler | |
| 2012/0124965 A1 | 5/2012 | Grabowski et al. | |
| 2012/0279229 A1 | 11/2012 | Zinn et al. | |
| 2012/0296482 A1 * | 11/2012 | Steven | G05B 13/02 |
| | | | 700/291 |

OTHER PUBLICATIONS

International Preliminary Report on Patentability for PCT Application No. PCT?US2013/032047, dated Apr. 16, 2015.
International Search Report & Written Opinion for International Application No. PCT/US2013/032047 dated Jul. 15, 2011.

* cited by examiner

| STRUCTURE | AIRFRAME #1 | AIRFRAME #2 | AIRFRAME #3 |
|---|---|---|---|
| FULL TABLE 1 | NAMEPLATE 1 | | |
| INCREMENT 1-1 | BUMP 1-1 | | |
| INCREMENT 1-2 | DERATE 1-1 | | |
| INCREMENT 1-3 | | | |
| FULL TABLE 2 | NAMEPLATE 2 | APR | |
| INCREMENT 2-1 | DERATE 2-1 | APR DERATE 1 | |
| INCREMENT 2-2 | | APR DERATE 2 | |
| INCREMENT 2-3 | | | |
| FULL TABLE 3 | NAMEPLATE 3 | MTO | MTO |
| INCREMENT 3-1 | DERATE 3-1 | MTO DERATE 1 | DERATE 1 |
| INCREMENT 3-2 | NAMEPLATE 4 | MTO DERATE 2 | DERATE 2 |
| INCREMENT 3-3 | DERATE 4-1 | | DERATE 3 |

METHOD OF DEFINING GAS TURBINE ENGINE CONTROL RATINGS

CROSS REFERENCE TO RELATED APPLICATION

This application claims priority to U.S. Provisional Application No. 61/708,353 filed on Oct. 1, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Operation of the gas turbine engine is controlled according to schedule of thrust settings. Engine operating parameters are modified and adjusted to provide the desired thrust setting according to the schedule. Different thrust settings are defined according to the schedule for different aircraft operating periods, such as for takeoff, climb, cruise and landing. Each operational period includes a different schedule of engine thrust, also referred to as a rating. Within each operating period adjustments are made to account for variations in temperature, pressure, altitude, aircraft weight and many other variable factors.

Moreover, each airframe manufacturer defines the desired thrust or rating schedule for each operating condition. Further, each airframe manufacturer may also require different rating schedules for different parts of the operating sequence from take-off to landing. The rating schedules are defined as part of an engine control program and are typically uniquely constructed for each engine and/or aircraft platform. Development of control programs can be costly and time intensive and therefore it is desirable to design a system that could be utilized for many different engine and aircraft platforms.

SUMMARY

A method of defining a rating schedule for a gas turbine engine according to an exemplary embodiment of this disclosure, among other possible things includes defining a plurality of generic rating structures adapted to receive corresponding groups of rating information, determining a set of desired ratings for a selected gas turbine engine, mapping each of the set the desired ratings to a corresponding one of the plurality of generic rating structures, generating a unique rating structure including the desired ratings mapped to the generic rating structure, and loading the generated unique rating structure into a controller that is configured to control the selected gas turbine engine according to the unique rating structure.

In a further embodiment of the foregoing method, the desired ratings include engine thrust levels for specific operational conditions.

In a further embodiment of any of the foregoing methods, includes defining a derate schedule for at least one of the generated unique rating structure and loading the derate schedule into the controller to correspond with the corresponding unique rating structure.

In a further embodiment of any of the foregoing methods, at least one of the ratings includes auxiliary power (APR) rating.

In a further embodiment of any of the foregoing methods, at least one of the desired ratings includes a take-off (MTO) power rating.

In a further embodiment of any of the foregoing methods, at least one of the desired ratings includes a continuous (MCT) power rating.

In a further embodiment of any of the foregoing methods, at least one of the desired ratings includes a climb power (MCL) rating.

In a further embodiment of any of the foregoing methods, at least one of the desired ratings includes a cruise power (MCR) rating.

In a further embodiment of any of the foregoing methods, includes a derate value for adjusting the desired rating.

In a further embodiment of any of the foregoing methods, includes a pointer for designating an auxiliary power rating for a desired power rating.

A system for operating a gas turbine engine according to an exemplary embodiment of this disclosure, among other possible things includes a plurality of generic rating structures adapted to receive corresponding groups of rating information, an input for receiving rating information for a selected gas turbine engine and for assigning the received rating information to one of the plurality of generic rating structures, and a controller for accessing the groups of rating information and for producing an output communicating for controlling the gas turbine engine to produce thrust corresponding to the rating information.

In a further embodiment of the foregoing system, the generic rating structures define logic structures for accepting rating values corresponding to the selected gas turbine engine.

In a further embodiment of any of the foregoing systems, the plurality of generic rating structures includes a corresponding plurality of generic derate structures for accepting information relating to adjusting the rating information responsive to selected operating conditions.

In a further embodiment of any of the foregoing systems, the received rating information includes a takeoff rating.

In a further embodiment of any of the foregoing systems, the received rating information includes a bump rating.

In a further embodiment of any of the foregoing systems, the received rating information includes a continuous rating.

In a further embodiment of any of the foregoing systems, the received rating information includes an auxiliary power rating.

In a further embodiment of any of the foregoing systems, includes a throttle input representing a desired thrust communicating with the controller such that the controller modifies the output for controlling the gas turbine engine responsive to the throttle input.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
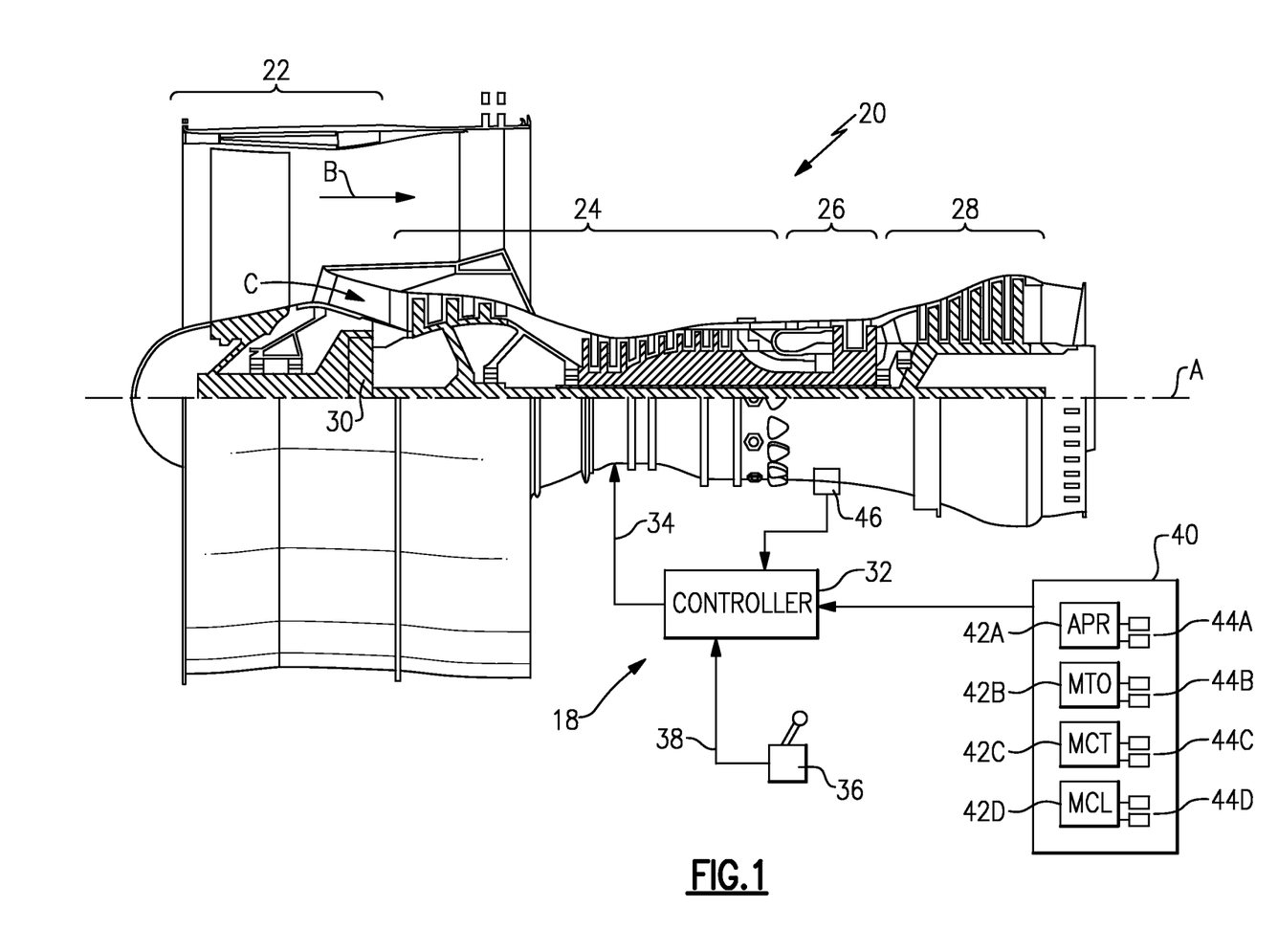
FIG. 1 is a schematic view of an example gas turbine engine.

FIG. 1 schematically illustrates an example gas turbine engine 20 that includes a fan section 22, a compressor section 24, a combustor section 26 and a turbine section 28 disposed along a central engine longitudinal axis A. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24. In this example the turbine section 28 drives a geared architecture 30 that in turn drives the fan section 22. The geared architecture 30 enables the turbine section 28 and the fan section 22 to each rotate at closer to optimal speeds.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. Moreover other power turbine machines such as a turboshaft engine utilized in rotary wing aircraft and power generation applications.

An engine control system 18 includes an engine controller 32 that provides an output 34 to control the gas turbine engine 20 to obtain the desired level of thrust output. The controller 32 is in communication with a throttle 36 and a rating schedule 40. The throttle 36 provides a throttle position output 38 to the controller 32 and the rating schedule 40 includes different thrust ratings that are selected for different aircraft operating conditions.

Engine control is accomplished by monitoring engine operational characteristics with sensors 46 that provide an output to the controller 32. As appreciated, a plurality of different sensors throughout the engine are utilized and schematically represented by the sensor 46. The sensor 46 provides information indicative of an engine thrust production or output.

Each engine will include several different engine thrust levels that correspond to different part of aircraft operation such as take-off, cruise or landing. Thrust ratings are certified for each engine an airframe combination. The rating schedule is utilized to maintain a balance between providing sufficient thrust to enable operation within predetermined parameters while limiting thrust to reduce wear on the engine. Thrust production is also referred to as an engine rating and different aircraft manufacturers utilize different rating values, terms and control schemes. For example, one airframe may have a takeoff (MTO) rating, a bump rating, a continuous (MCT) rating and a climb (MCL) rating while another may replace the bump rating with an auxiliary power reserve (APR) rating. In this example, the rating schedule includes ratings 42A-D.

Additionally, each category of rating may further have different variations. For example, engine idle ratings may include different variants for ground, flight and approach conditions. Moreover, a cruise (MCR) rating may have been included to instruct engine operating parameters during cruise operations. The cruise (MCR) rating may also have variants to address different aircraft operating conditions.

The ratings 42A-D is typically determined for a standard set of environmental conditions such as temperature and pressure. Accordingly, some adjustment is provided to enable variation from the ratings 42A-D based on environmental parameters along with aircraft payload and other aircraft variable characteristics. The specific derate is selected by the pilot to balance aircraft performance with engine durability. The pilot selects the desired derate based on the environment and aircraft configuration to minimize operating stresses on the engine. The adjustments are referred to by those skilled in the art as derate and are associated with each of the ratings 42A-D. In this example each rating includes derates 44A-D. As appreciated, although two derates 44A-D are shown that correspond with each rating 42A-D, any number of derates could be associated with each rating 42A-D.

Because each aircraft manufacturer utilizes different ratings, engines controls and rating schedules are different. Therefore one rating schedule and control logic cannot accommodate all potential combinations. Simply constructing a common logic structure with ratings for all aircraft manufactures is inefficient and memory intensive.

Figure 2:
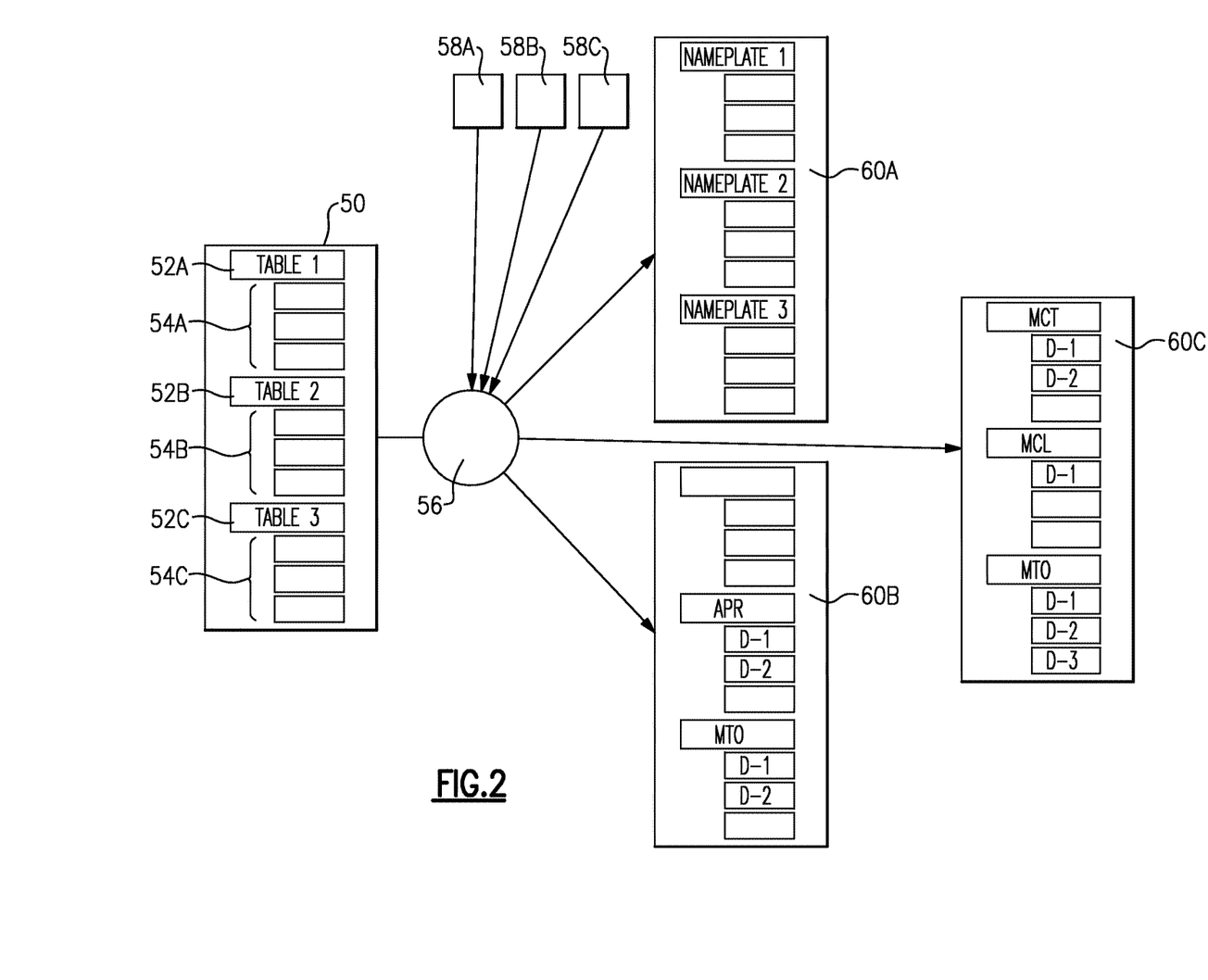
FIG. 2 is a schematic view of an example method of mapping ratings to a generic logic structure.

Referring to FIG. 2 with continued reference to FIG. 1, a disclosed method provides a generic rating structure 50 that reuses a common memory and algorithm in a way that can be customized for individual airframer rating requirements. In this example the generic rating structure 50 is a memory device that includes structured memory locations referred to as tables 52A-C and corresponding memory locations for derate values 54A-C.

Accordingly, the example system 18 provides a generic logic set 50 that can be mapped to the desired rating. For example, instead of having APR, MTO, MCT and MCL ratings, generic rating structures 52A-D are available. An input device 56 receives rating information schematically indicated at 58A-C and assigns portions of the generic logic structure 50 to receive the input rating information 58A-C.

Therefore, for a given airframe customer, the generic logic structures 52A-C are mapped to the desired and selected rating structures 58A-C that include some combination of APR, MTO, MCT, MCR and MCL. A final rating schedule is constructed for each different airframe from the same generic rating structure 50 that is mapped to the different set of ratings 58A-C. Accordingly, final rating schedules 60A-C are generated to include the desired combination of APR, BUMP, MTO, MCT and MCL.

The final rating schedules 60A may not include all possible ratings, one customer may utilize APR and MTO, while yet another customer may utilize only MTO, MCT and MCL. Moreover, some ratings may require the use of different maximum thrust rating values referred to as Namplates as is shown by way of example in the rating schedule

60A. Moreover, in some completed rating schedules, some logic locations would be unused such as is indicated at 60B.

Figure 3:
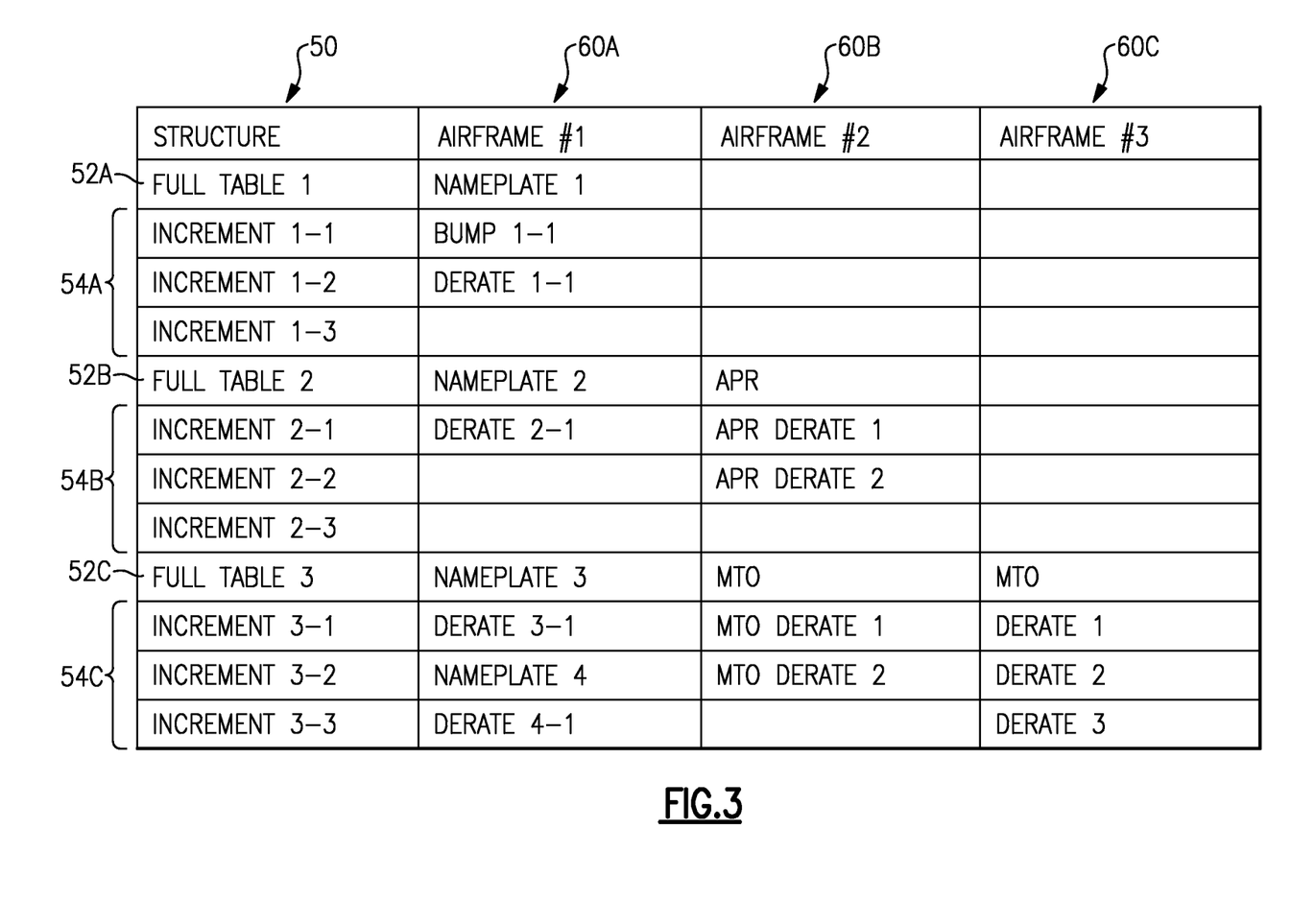
FIG. 3 is a table illustrating different mapped ratings to a common generic logic structure.

Referring to FIG. 3, the tables 52A-C of the generic logic structure is shown mapped to provide rating schedules 60A-C according to different airframe requirements. The generic tables 52A-C along with the derate A-C are present in each of the different rating schedules 60A-C, but hold different rating values and conditions that correspond with the airframe rating requirements.

Figure 4:
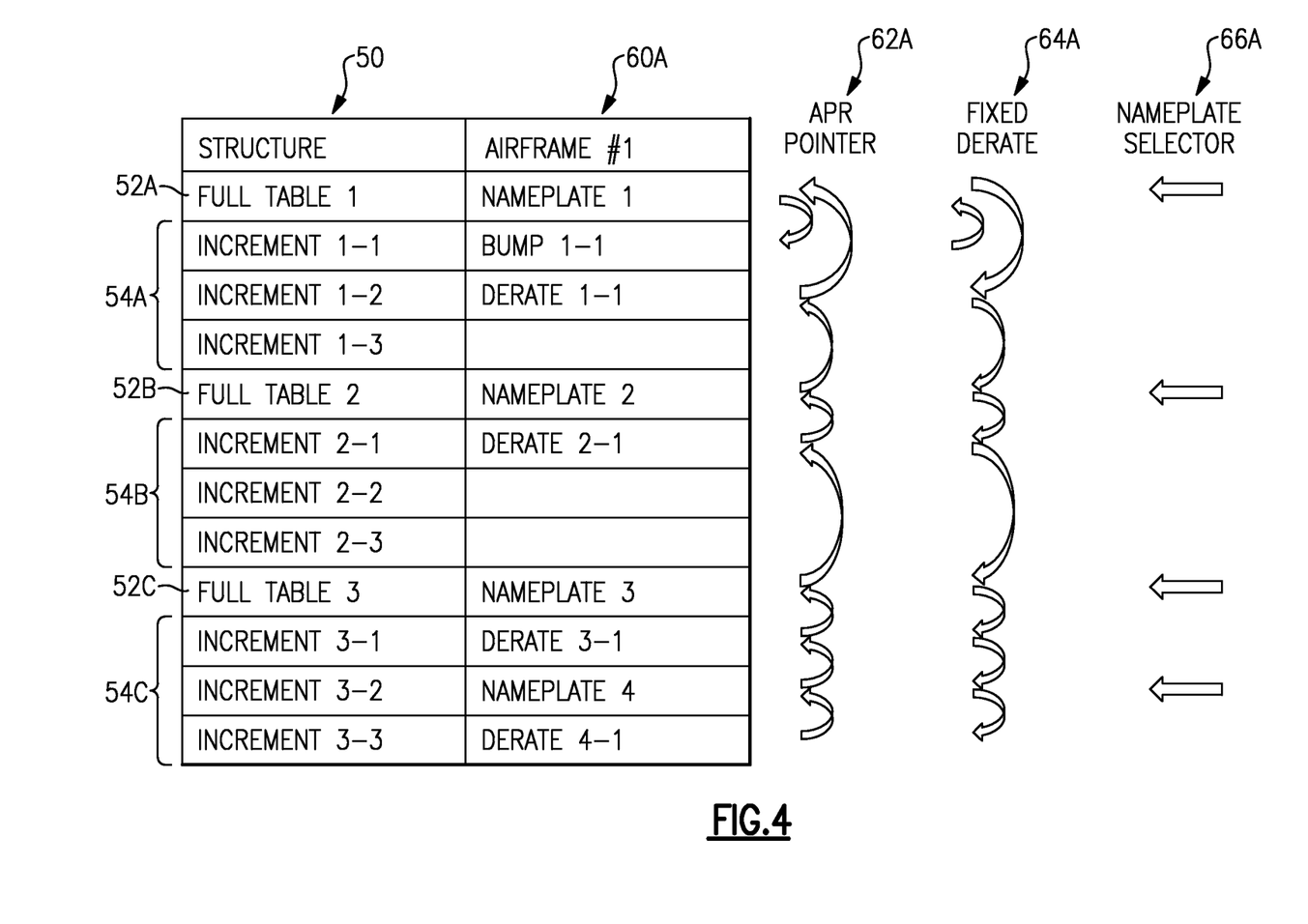
FIG. 4 is a table illustrating one example rating schedule mapped to the generic logic structure.
Figure 5:
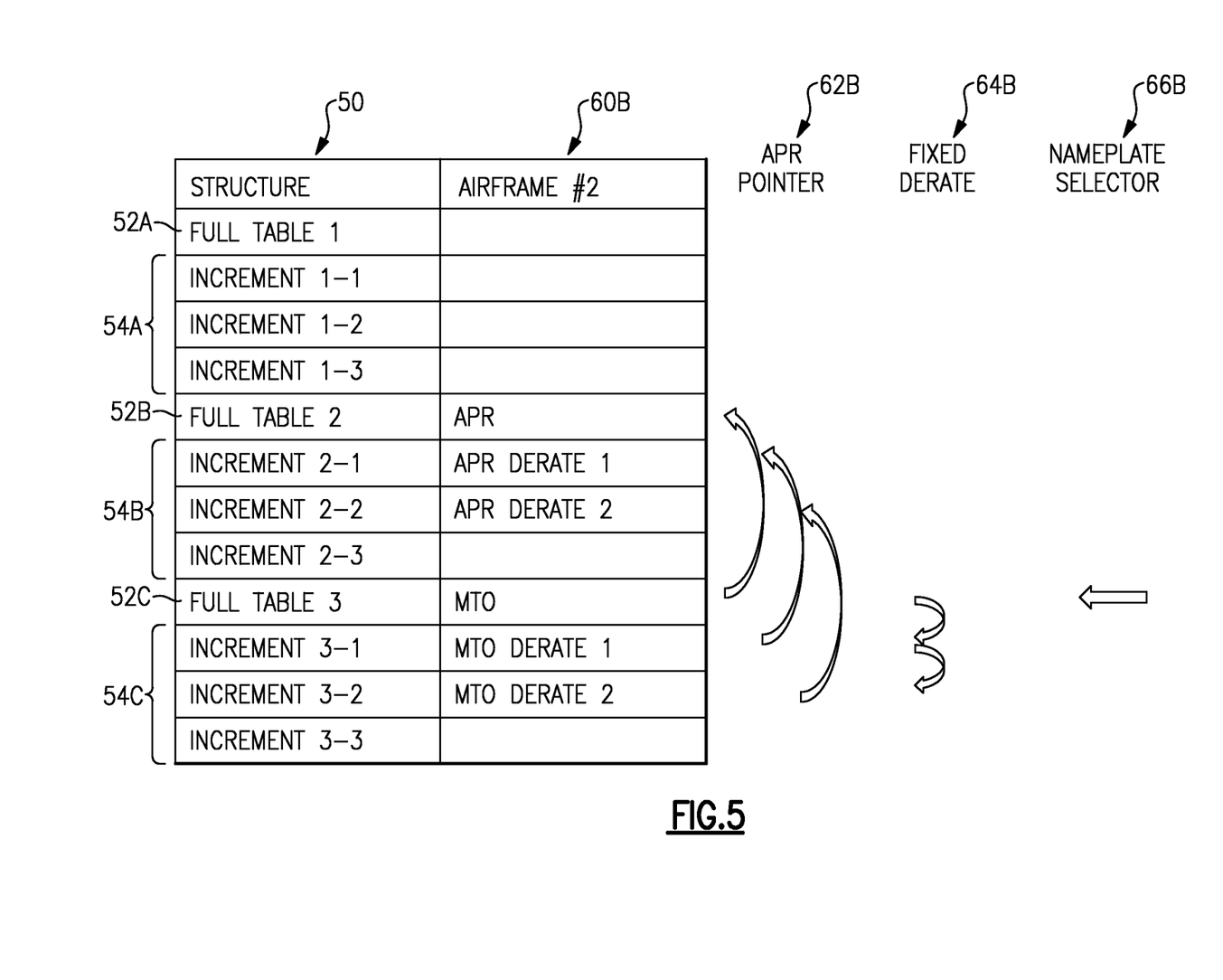
FIG. 5 is another table illustrating another example rating schedule mapped to the generic logic structure.
Figure 6:
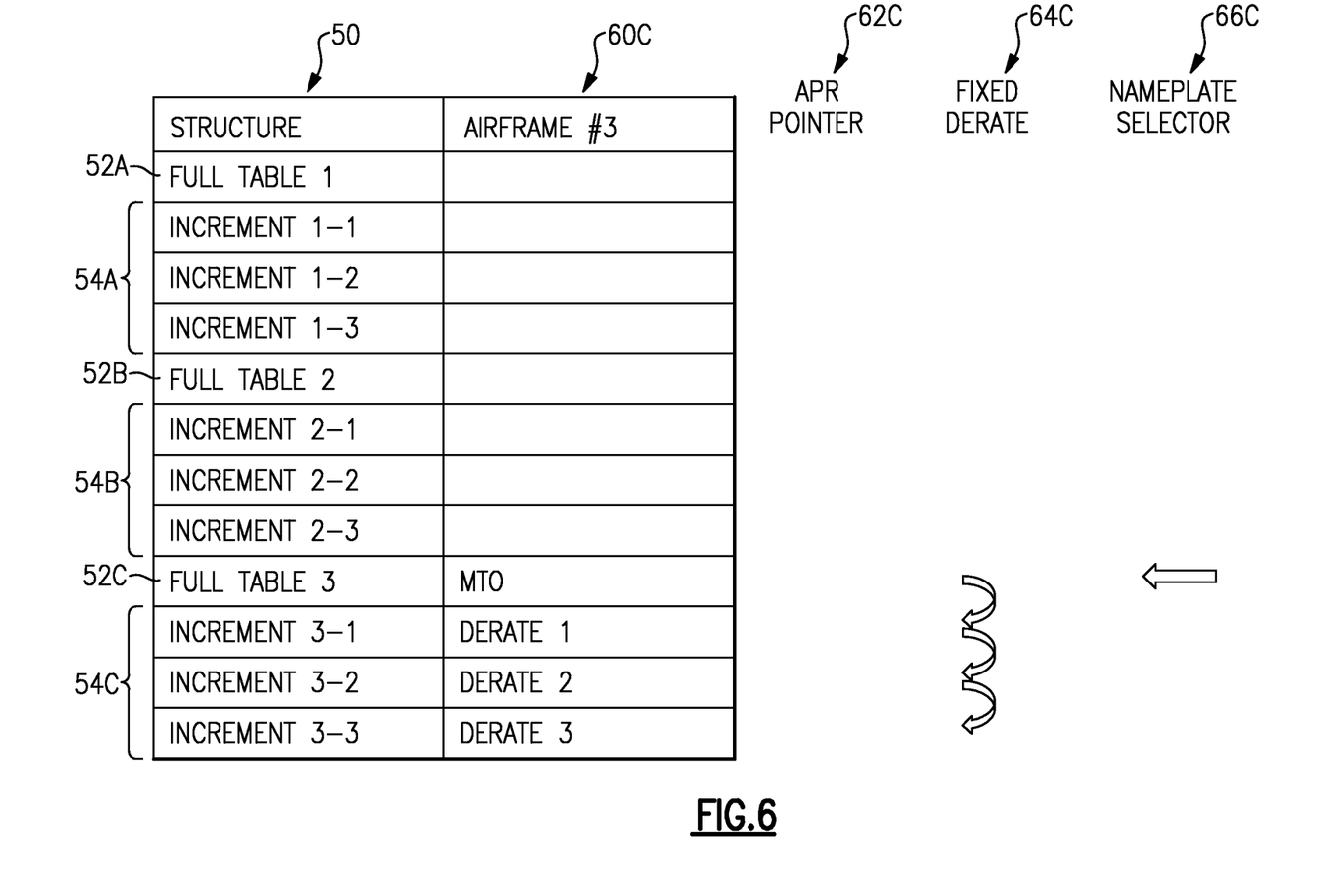
FIG. 6 is another table illustrating another example rating schedule mapped to the generic logic structure.

Referring to FIGS. 4, 5 and 6, along with the different rating structures that are generated from the common logic structure different auxiliary power rating pointers 62A-C are applied to define transition between ratings. As is schematically shown in FIG. 4, the auxiliary power rating is a term known in the art utilized to describe a reserve amount of thrust accommodated at each power rating. Like the thrust ratings, the APR rating changes for each rating and derate value. The example generic logic structure 50 enables adaptation to different fixed rate transitions as indicated at 64A. In the example show in FIG. 4, there are many defined fixed derate transitions 64A defined for the rating schedule 60A. Additionally, a nameplate selector 66A is enabled for selecting which of the ratings will provide the maximum engine thrust. In most rating schedules only a single nameplate is selected, however the disclosed generic logic structure 50 enables adaptations to include several nameplate selection as is indicated in FIG. 4.

Referring to FIGS. 5 and 6, different rating schedule are illustrated in comparison to the original data structure 50. The rating schedules 60B and 60C do not utilize all of the tables 52A-C in the generic structure 50 as not all of the space is required to accommodate the different requirements. Moreover, the placement of each rating value can be within any of the tables 52A-C and is not constrained with beginning with the first available table such as for example 52A. Moreover the APR pointers 62B and 62C may not all be utilized. In the rating schedules 60B and 60C, only a single Namplate selector 66B and 66C are utilized and shown.

It should be understood that three tables 52A-C and three derates 54A-C for each of the tables 52A-C are shown by way of example, but any number of tables, and derates are within the contemplation of this disclosure to provide the generic logic structure capable of receiving information for any number of combination of rating settings and requirements.

Moreover, the example method is performed on the system 18 or another computing device such as microprocessor or the disclosed controller 32. In terms of hardware architecture, the controller can include a processor, a memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

Moreover, the completed rating schedule 40, can be stored in a memory and that the memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 32 is in operation, the processor can be configured to execute software stored within the memory, to communicate data to and from the memory, and to generally control operations pursuant to the software and to the rating schedule 40. Software in memory, in whole or in part, is read by the processor, perhaps buffered within the processor, and then executed.

The system 18 and controller 32 utilizes the generated rating schedule 40 to control operation of the engine 20 and provide the desired thrust and performance while mitigating unnecessary wear extend engine operational life.

The disclosed system and method provides a generic framework for ratings combined with simple selection logic to customize rating schedules for multiple airframe customers. This reduces software design effort, reduces memory consumption, and reduces processor throughput.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of defining a rating schedule for a gas turbine engine comprising:
    defining a plurality of generic rating structures adapted to receive corresponding groups of rating information;
    determining a set of desired ratings for a selected gas turbine engine;
    mapping each of the set the desired ratings to a corresponding one of the plurality of generic rating structures, wherein at least one of the desired ratings comprises an auxiliary power (APR) rating;

generating a unique rating structure including the desired ratings mapped to the generic rating structures;

loading the generated unique rating structure into a controller that is configured to control the selected gas turbine engine according to the unique rating structure; and controlling the selected gas turbine engine based on the unique rating structure loaded into the controller.

2. The method as recited in claim 1, wherein the desired ratings include engine thrust levels for specific operational conditions.

3. The method as recited in claim 1, including defining a derate schedule for at least one of the generated unique rating structure and loading the derate schedule into the controller to correspond with the corresponding unique rating structure.

4. The method as recited in claim 1, wherein at least one of the desired ratings comprises a take-off (MTO) power rating.

5. The method as recited in claim 1, wherein at least one of the desired ratings comprises a continuous (MCT) power rating.

6. The method as recited in claim 1, wherein at least one of the desired ratings comprises a climb power (MCL) rating.

7. The method as recited in claim 1, wherein at least one of the desired ratings comprises a power (MCR) rating.

8. The method as recited in claim 1, including a derate value for adjusting the desired rating.

9. A method of defining a rating schedule for a gas turbine engine comprising:

defining a plurality of generic rating structures adapted to receive corresponding groups of rating information;

determining a set of desired ratings for a selected gas turbine engine;

mapping each of the set desired ratings to a corresponding one of the plurality of generic rating structures;

generating a unique rating structure including the desired ratings mapped to the generic rating structures, wherein the unique rating structure includes a pointer for designating an auxiliary power rating for a desired power rating;

loading the generated unique rating structure into a controller that is configured to control the selected gas turbine engine according to the unique rating structure; and controlling the selected gas turbine engine based on the unique rating structure loaded into the controller.

10. A system for operating a gas turbine engine comprising a plurality of generic rating structures adapted to receive corresponding groups of rating information;

an input for receiving rating information for a selected gas turbine engine and for assigning the received rating information to one of the plurality of generic rating structures, wherein the received rating information includes at least an auxiliary power rating;

a controller for accessing the groups of rating information and for producing an output for controlling the gas turbine engine to produce thrust corresponding to the rating information; and a throttle input representing a desired thrust communicating with the controller such that the controller modifies the output for controlling the gas turbine engine responsive to the throttle input.

11. The system as recited in claim 10, wherein the generic rating structures define logic structures for accepting rating values corresponding to the selected gas turbine engine.

12. The system as recited in claim 10, wherein the plurality of generic rating structures includes a corresponding plurality of generic derate structures for accepting information relating to adjusting the rating information responsive to selected operating conditions.

13. The system as recited in claim 10, wherein the received rating information comprises a takeoff rating.

14. The system as recited in claim 10, wherein the received rating information comprises a bump rating.

15. The system as recited in claim 10, wherein the received rating information comprises a continuous rating.

* * * * *

UNITED STATES PATENT AND TRADEMARK OFFICE
CERTIFICATE OF CORRECTION

Page 1 of 1

PATENT NO. : 9,909,510 B2
APPLICATION NO. : 14/430589
DATED : March 6, 2018
INVENTOR(S) : Poth, Jr.

It is certified that error appears in the above-identified patent and that said Letters Patent is hereby corrected as shown below:

In the Claims

Claim 1, Column 6, Line 64; replace "each of the set of the desired" with --each of the set of desired--

Claim 7, Column 7, Line 27; replace "a power" with --a cruise power--

Claim 9, Column 7, Line 36; replace "each of the set desired" with --each of the set of desired--

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*